(12) United States Patent
Choy

(10) Patent No.: US 6,377,024 B1
(45) Date of Patent: Apr. 23, 2002

(54) METHOD AND SYSTEM FOR CHARGE EQUALIZATION OF LITHIUM-ION BATTERIES

(75) Inventor: Winnie W. Choy, Cerritos, CA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 09/816,980

(22) Filed: Mar. 23, 2001

(51) Int. Cl.[7] .................................................. H02J 7/00
(52) U.S. Cl. ........................................ 320/118; 320/116
(58) Field of Search ................................. 320/118, 116, 320/117, 119, 162, 152

(56) References Cited

U.S. PATENT DOCUMENTS 5,652,501 A * 7/1997 McClure et al. ............ 320/118
5,929,603 A * 7/1999 Nakao et al. ................ 320/136
6,075,346 A * 6/2000 Kikuchi et al. ............. 320/150
6,285,161 B1 * 9/2001 Popescu ...................... 320/118

* cited by examiner

Primary Examiner—Peter S. Wong
Assistant Examiner—Lawrence Luk
(74) Attorney, Agent, or Firm—Terje Gudmestad

(57) ABSTRACT

A system (10) and method (100) for charge and discharge equalization of a lithium-ion battery having a plurality of cells (12) in series. A central charge controller (16) and a central discharge controller (22) command a rate of charge to individual charge controllers (14) associated with each cell (12) of the battery for maintaining equalized charge at each cell (12) of the battery. The charging and discharging is initiated upon sensing a predetermined maximum charge threshold voltage (104) and a predetermined minimum discharge threshold voltage (114) at each cell in the series of cells.

6 Claims, 1 Drawing Sheet

METHOD AND SYSTEM FOR CHARGE EQUALIZATION OF LITHIUM-ION BATTERIES

TECHNICAL FIELD

The present invention relates generally to lithium-ion battery systems, and more particularly to a method and system for charge equalization in a lithium-ion battery system.

BACKGROUND ART

A typical lithium-ion battery for a spacecraft has twenty or thirty cells in series, which are, very sensitive to overcharging and over-discharging, thereby requiring complex protection circuits.

A common approach to charging/discharging the batteries uses a primary/redundant charger and a primary/redundant discharger for all cells that are in series. A voltage clamp circuit is used to protect the cells from overcharging, and a disconnect switch and bypass switch protect the cells from over-discharging.

This is a complex and costly approach to charging and equalizing lithium-ion batteries. There is a waste of valuable bus power in the charge mode when the voltage clamp circuit is protecting the cells from overcharging. Also, the clamp circuit typically requires additional heat sinking to dissipate heat. There is a strong dependency on electro-mechanical devices to protect the cells from over-discharging, and such devices have limited life cycles.

There is a need for a simple, low cost and effective method of charging and equalizing the cells of lithium-ion batteries used on board a spacecraft.

SUMMARY OF THE INVENTION

It is an object of the present invention to provide a method of charging and equalizing the cells of a lithium-ion battery. It is another object of the present invention reduce the cost and complexity of the charging and equalizing system.

It is a further object of the present invention to provide reliable and efficient control of cell charge equalization, eliminating the need for a separate charge equalization circuit for each cell. It is still a further object of the present invention to provide individual chargers that are used during periods of charging and discharging for balancing cells in a lithium-ion battery.

The present invention is a system and method for charging and equalizing a lithium-ion battery having a single discharger for all of the cells in a series and a separate charger for each cell in the series. In a charge mode, the cell charger can terminate charging or reduce the level of charging when a cell reaches a maximum charge threshold, thereby avoiding overcharging. In a discharge mode, the discharge controller will command the cell charger to resume charging a particular cell when that individual cell reaches a minimum discharge threshold.

These and other features of the present invention will be better understood with regard to the following description, appended claims, and accompanying drawings.

BEST MODE FOR CARRYING OUT THE INVENTION

Figure 1:
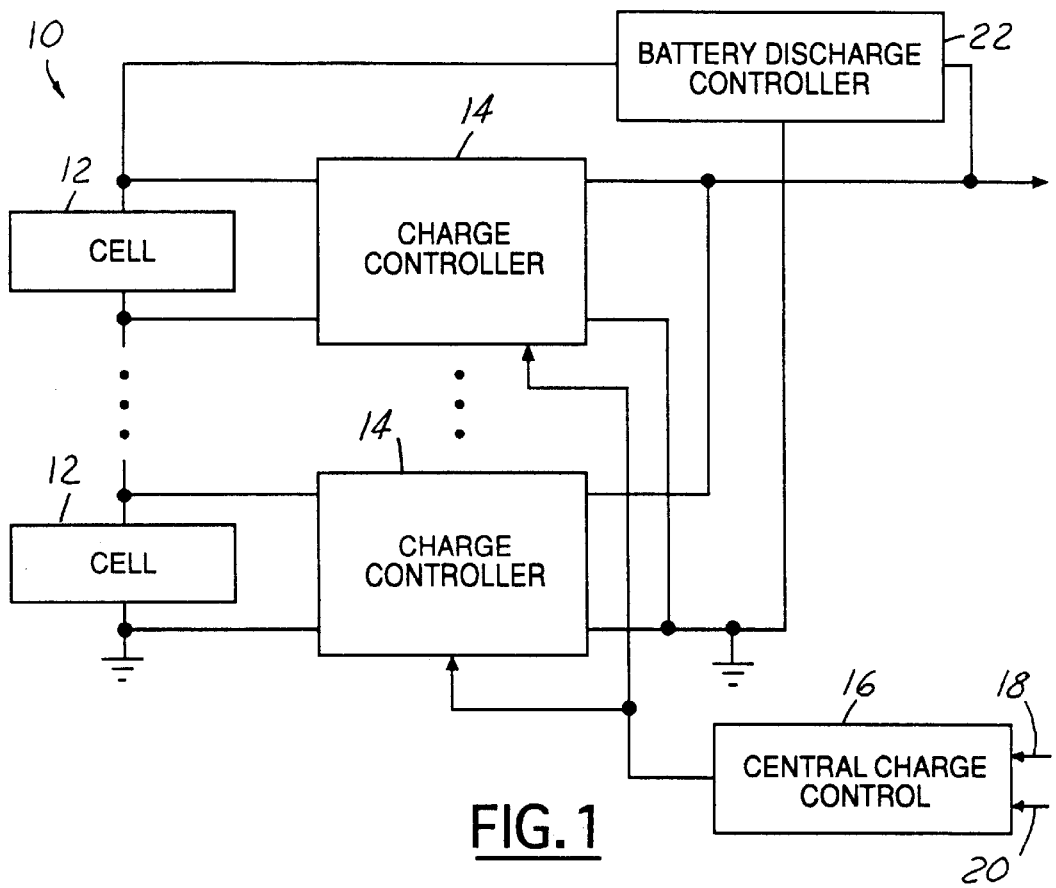
FIG. 1 is a block diagram of an embodiment of the present invention having individual chargers for each cell in a series and a single discharger for all of the cells in the series.

Referring to FIG. 1 there is shown a block diagram of a single series 10 of cells 12 for a lithium-ion battery. Each cell 12 has an individual lithium-ion cell charger 14 and the cells are connected in series. A central charge control unit 16 is used for independent control of each of the chargers 14. The individual cell chargers 14 are typically direct current (DC) to DC converters that regulate the charge current. A regulated bus voltage sense signal 18 will provide indication to the central charge control unit when there is sufficient solar array power to charge the lithium-ion battery. The individual cell chargers 14 will charge each cell at a commanded charge rate 20 sent from the central charge control unit 16.

Each charger 14 has a battery voltage sense circuit (not shown) therein. When a predetermined maximum charge voltage threshold is sensed at each cell 12, charging will terminate, or may be tapered by maintaining a constant voltage charge. Each battery cell charge controller 14 can be terminated independently of the other charge controllers to avoid over-charging any one cell that may charge faster than others.

A single battery discharge controller 22 is connected to all of the cells 12 in the series 10. The discharge controller 22 is typically a DC to DC converter, which processes battery power to regulate a power bus 24 during periods of eclipse or to support bus transient during periods of sunlight.

The battery voltage sense circuit (not shown) in each charge controller 14 monitors the cell voltage during discharge as well. When a minimum cell discharge voltage threshold is reached for a particular cell 12, its respective charger 14 will resume charging to avoid over-discharging that particular cell. In this respect, the need for cell discharge disconnect and bypass switches is eliminated.

Figure 2:
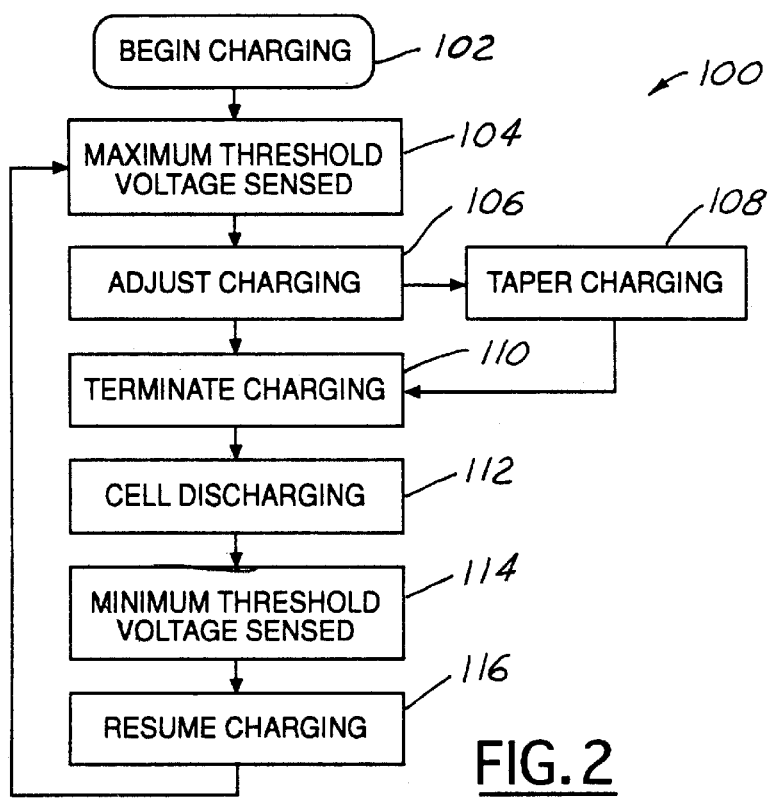
FIG. 2 is a flow chart of the method of the present invention.

FIG. 2 is a flow chart of the method 100 of the present invention. The regulated bus sense signal will indicate when there is sufficient solar array power available to charge the battery. Upon indication, the individual cell chargers will begin charging 102 at a commanded charge rate. If the available array power is less than the commanded charge rate, the cells will charge at a reduced rate.

A predetermined maximum charge threshold voltage is sensed 104 by the cell chargers and charging is adjusted 106 accordingly. The charging may be tapered 108 by maintaining a constant voltage charge until charging is terminated 110, or charging may be terminated 110 directly.

Each battery cell charging can be terminated independent of the other cells. This feature avoids over-charging a particular cell. At this point, the cells begin discharging 112.

When all of the battery cells are connected in series as in the present invention a higher input voltage is provided. In this regard, the discharge controller can have a higher conversion efficiency, typically on the order of 95%. During charging and discharging, the battery voltage sense circuit in the individual charge controllers monitor the cell voltage. When a minimum discharge threshold voltage is sensed 114 for a particular cell, the battery discharge controller will command the cell's respective charge controller to resume charging 116.

The present invention significantly reduces the number of components associated with cell charging and discharging by eliminating the need for complex disconnect and bypass switches. By reducing the number of components, the complexity and the cost of the battery system are reduced as well.

In addition, individual cell charging according to the present invention allows better control of cell charge equalization, as each charger can terminate or resume charging dependent on the state of the charge of the battery.

Accordingly, the present invention is intended to embrace all such alternatives, modifications and variations that fall within the spirit and scope of the appended claims.

What is claimed is:

1. A system for charge and discharge equalization of a lithium-ion battery having a plurality of cells arranged in series, said system comprising:

a plurality of cell chargers wherein a cell charger is associated with a respective cell in the series of cells;

a single discharge controller for the series of cells, said single discharge controller being connected to each cell in the series of cells;

a predetermined charge voltage threshold sensed by a respective cell charger for determining when to adjust charging a respective cell independent of the other cells;

a predetermined discharge voltage threshold sensed by said respective cell charger for determining the activation of each of said cell chargers independent of the other cell chargers; and said cells are charged and discharged without overcharging and over-discharging.

2. The system as claimed in claim 1 further comprising a central charge command controller for controlling said cell chargers.

3. The system as claimed in claim 2 wherein said central charge command controller provides a commanded charge rate to said plurality of cell chargers.

4. A method for charging and discharging a series of cells in a lithium-ion battery having an independent charger for each cell in the series and a discharger for the series of cells, said method comprising the steps of:

charging each cell in the series of cells at a commanded charge rate;

determining when each cell meets a predetermined maximum charge voltage threshold;

altering the charging of each cell independently of other cells in the series;

determining when a cell meets a predetermined minimum discharge voltage threshold; and resuming charging of said cell independently of other cells in the series.

5. The method as claimed in claim 4 wherein said step of altering the charging of each cell further comprises terminating the charging of each cell independently of the other cells in the series.

6. The method as claimed in claim 4 wherein said step of altering the charging of each cell further comprises maintaining a constant voltage charge of each cell independently of the other cells in the series.

* * * * *